Patented Feb. 10, 1931

1,792,156

UNITED STATES PATENT OFFICE

WILHELM FITZKY, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

5-HALOGEN-2-AMINO-1-ALKYLOXY AND 1-ARALKYLOXY-BENZENES AND INTERMEDIATE PRODUCTS THEREOF AND PROCESS OF PREPARING THEM

No Drawing. Application filed January 5, 1929, Serial No. 330,625, and in Germany January 17, 1928.

My present invention relates to 5-halogen-2-amino-1-alkyloxy-and-1-aralkyloxy-benzenes and intermediate products thereof and to a process of preparing them.

When halogenating 2-acyl-amino-1-alkyloxy-and-1-aralkyloxy-benzenes according to the halogenating methods usually applied to acylated organic amines, there are obtained as mono-halogen products chiefly 4-halogen-2-acylamino-1-alkyloxy-and-1-aralkyloxy-benzenes.

Now I have found that by causing a quantity of halogen, adequate for the introduction of 2 halogen atoms, to act upon a di-substituted symmetrical diphenyl-urea of the following general formula:

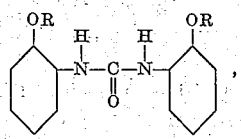

wherein R stands for alkyl or aralkyl, there are almost exclusively obtained the hitherto unknown dihalogen compounds of the following general formula:

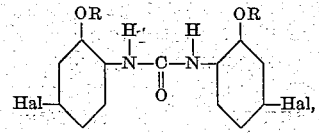

wherein R stands for alkyl or aralkyl. These compounds, when being split up by means of a caustic alkali or ammonium hydroxide, are converted into 5-halogen-2-amino-1-alkyloxy-and-1-aralkyloxy benzenes which hitherto could only be produced with great difficulty, were but partly known, and have the following general formula:

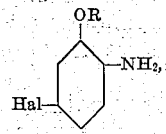

wherein R stands for alkyl or aralkyl.

The halogenating operations can be carried out according to the most varied methods without the result being considerably altered thereby.

The o,o'-dialkyloxy-and-o,o'-diaralkyloxy-diphenyl-ureas used as starting materials are obtainable by causing the corresponding amino compounds to react with phosgene in the presence of an acid binding agent.

In the same way as the diphenyl-ureas referred to, the corresponding diphenylthioureas are suitable for the manufacture of 5-halogen-2-amino-1-alkyloxy and 1-aralkyloxy benzenes.

The following examples serve to illustrate my invention but they are not intended to limit it thereto, the parts being by weight.

1. 136 parts of o,o'-dimethoxydiphenyl-urea are suspended in about 1000 parts of tetrachlorethane. To this suspension are added drop by drop, while stirring, 145 parts of sulfuryl-chloride at a temperature between 10° C. and 30° C. When the chlorination is complete the solvent is distilled off. The dichloro compound thus obtained and having the following probable formula:

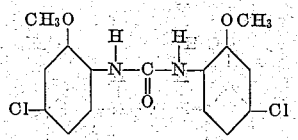

is heated together with 100 parts of ammonia of 25 per cent strength and 500 parts of water in a closed vessel for four hours up to 150° C. After cooling, the base is filtered by suction and dissolved in diluted hydrochloric acid. The hydrochloride is salted out and worked up as usual so as to obtain the free base. The compound thus obtained is the 5-chloro-2-amino-1-methoxybenzene which, after distillation in a vacuum and recrystallization from petroleum ether, melts at about 52° C.

2. Into a suspension of 136 parts of o,o'-dimethoxy-diphenyl-urea and 850 parts of nitro-benzene are introduced 75 parts of chlorine. The solvent is then distilled off. To the residue there are added 240 parts of caustic soda solution of 35 per cent strength, 350 parts of water and 10 parts of alcohol; this mixture is heated in a closed vessel for 4 hours to 175° C. After cooling, the base is filtered off by suction and worked up as indicated in Example 1. The 5-chloro-2-amino-1-methoxy benzene of the melting point of 52° C, is obtained thereby.

3. 140 parts of o,o'-dimethoxy-diphenyl-urea are suspended in about 1000 parts of tetrachlorethane. To this suspension are then added drop by drop, while stirring, 960 parts of bromine at a temperature of between 10° C. and 30° C. When the bromination is complete the solvent is distilled off. The residue which chiefly consists of a dibromine compound of the following probable formula:

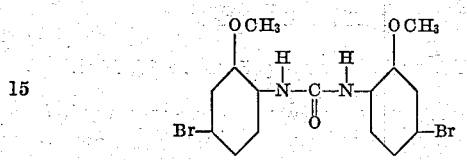

is heated together with 700 parts of ammonia in a closed vessel for 10 hours up to 150° C. After cooling, the mass is filtered off by suction and dissolved in diluted hydrochloric acid. The hydrochloride is salted out and worked up as usual so as to obtain the free base. The 5-bromo-2-amino-1-methoxybenzene thus obtained, after distillation in a vacuum and recrystallization from petroleum ether, melts at 60° C.-61° C.

4. 150 parts of o,o'-diethoxy-diphenyl-urea are suspended in 1000 parts of tetrachlorethane. To this suspension are added drop by drop, while stirring, 145 parts of sulfurylchloride at a temperature of between 10° C. and 20° C. When the chlorination is complete the solvent is distilled off. The chlorination product thus obtained has the probable formula:

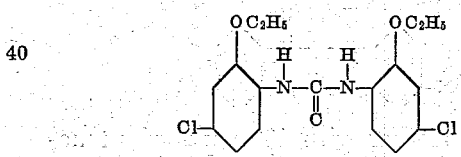

On addition of 200 parts of ammonia of 25 per cent strength and 500 parts of water the product is treated in a closed vessel for 5 hours to 150° C. After cooling, the base which forms an oil is separated from the reaction mass and dissolved in diluted hydrochloric acid. The hydrochloride is salted out and worked up as usual so as to obtain the free base. The compound is the 5-chloro-2-amino-1-ethoxybenzene which, after distillation in a vacuum and recrystallization from petrol ether, melts at 32° C.

5. 178 parts of o,o'-dibutyloxy-diphenyl-urea are suspended in 1500 parts of tetrachlorethane. To this suspension are added drop by drop, while stirring, 145 parts of sulfuryl-chloride at a temperature of between 10° C. and 30° C. When the chlorination is complete the solvent is distilled off. The residue which chiefly consists of the dichloro compound of the following probable formula:

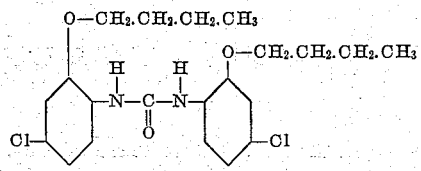

is heated together with 300 parts of ammonia of 25 per cent strength and 700 parts of water for 6 hours to 180° C. After cooling, the oil is separated and dissolved in diluted hydrochloric acid. The hydrochloride is salted out and worked up as usual so as to obtain the free base. The 5-chloro-2-amino-1-butyloxybenzene is a colorless viscous oil, which boils at 160° C. under a pressure of 12 mm.

The dibutyloxy-diphenyl-urea is obtainable from phosgene and o-amino-phenyl butyl-ether; the latter can be produced from o-chlornitro-benzene and butyl alcohol in the presence of an acid binding agent and by subsequent reduction.

6. 212 parts of o,o'-dibenzyloxy-diphenyl-urea are dissolved in 4000 parts of chlorobenzene. 145 parts of sulfury-chloride are then added drop by drop, while stirring, at a temperature of between 20° C. and 30° C. When the chlorination is complete, the solvent is expelled by means of water-vapor. The residue which chiefly consists of the dichloro compound of the following probable formula:

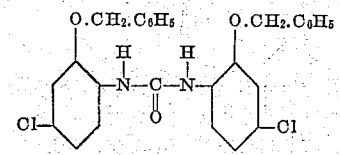

is heated together with 700 ccm. of ammonia of 25 per cent strength in a closed vessel for 7 hours to 150° C. After cooling, the base is filtered off by suction and dissolved in diluted hydrochloric acid. The hydrochloride is salted out and worked up as usual so as to obtain the free base. The 5-chloro-2-amino-1-benzoyloxy-benzene melts at 46°–47° C.

The dibenzyloxy-diphenyl-urea can be produced from phosgene and o-aminophenyl-benzyl ether, the latter being obtainable from o-nitrophenol and benzylchloride in the presence of an acid binding agent and subsequent reduction.

In the following claims the term "strong alkali" is to be understood as comprising caustic alkalies and ammonium hydroxide.

I claim:

1. The process of obtaining amines of the following general formula:

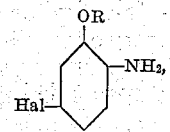

wherein R stands for alkyl or aralkyl, which comprises treating a di-substituted symmetrical diphenyl-urea of the following general formula:

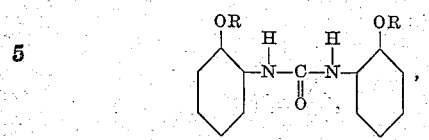

wherein R stands for alkyl or aralkyl, with a quantity of a halogenating agent adequate for the introduction of 2 halogen atoms, and heating the di-halogen compound thus obtained and having the following formula:

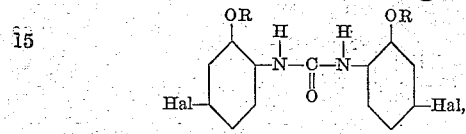

wherein R stands for alkyl or aralkyl, in an aqueous solution of a strong alkali.

2. The process of obtaining amines of the following general formula:

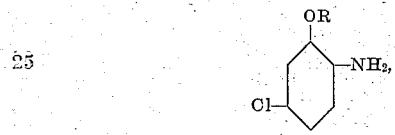

wherein R stands for alkyl or aralkyl, which comprises treating a di-substituted symmetrical diphenyl-urea of the following general formula:

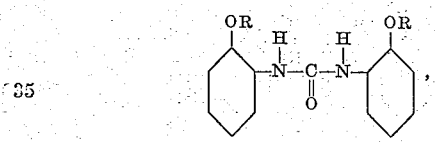

wherein R stands for alkyl or aralkyl, with a quantity of a chlorinating agent adequate for the introduction of 2 chlorine atoms and heating the dichloro compound thus obtained and having the following general formula:

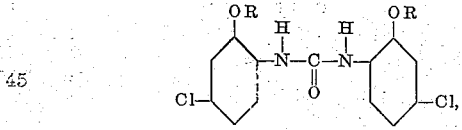

wherein R stands for alkyl or aralkyl, in an aqueous solution of a strong alkali.

3. The process of obtaining amines of the following general formula:

which comprises treating a di-substituted symmetrical diphenyl-urea of the following general formula:

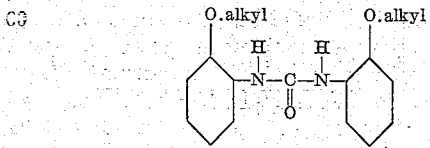

with a quantity of a halogenating agent adequate for the introduction of 2 halogen atoms and heating the dihalogen compound thus obtained and having the following general formula:

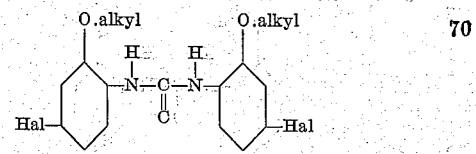

in an aqueous solution of a strong alkali.

4. The process of obtaining amines of the following general formula:

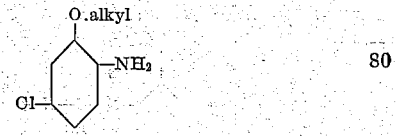

which comprises treating a di-substituted symmetrical diphenyl-urea of the following general formula:

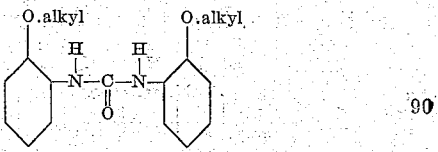

with a quantity of a chlorinating agent adequate for the introduction of 2 chlorine atoms and heating the dichloro compound thus obtained and having the following general formula:

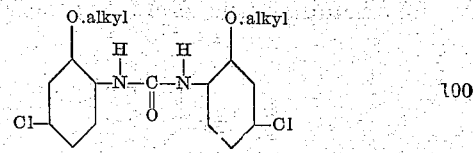

in an aqueous solution of a strong alkali.

5. The process of obtaining amines of the following general formula:

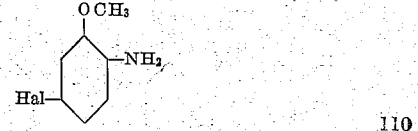

which comprises treating the symmetrical dimethoxy-diphenyl-urea of the following formula:

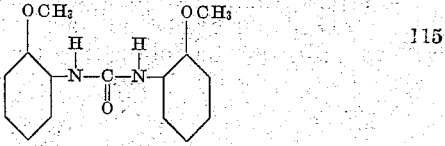

with a quantity of a halogenating agent adequate for the introduction of 2 halogen atoms and heating the dihalogen compound thus obtained and having the following general formula:

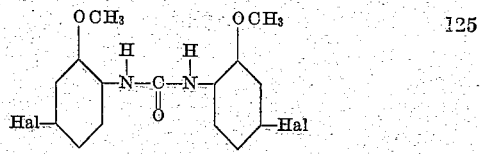

in an aqueous solution of a strong alkali.

6. The process of obtaining 5-chloro-2-amino-1-methoxy benzene, which comprises treating the symmetrical dimethoxy-diphenyl-urea of the following formula:

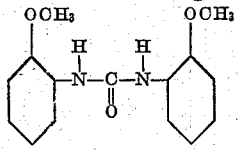

with a quantity of a chlorinating agent adequate for the introduction of 2 chlorine atoms and heating the dichloro-dimethoxy-diphenyl-urea of the following formula:

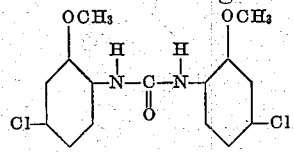

in an aqueous solution of a strong alkali.

7. As new products, dihalogen compounds of the following general formula:

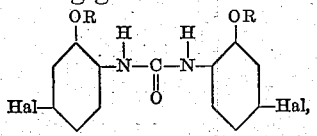

wherein R stands for alkyl or aralkyl, which, when being heated in an aqueous solution of a strong alkali, are split up with formation of an alkali salt of carbonic acid into 2 mols of an amine of the following general formula:

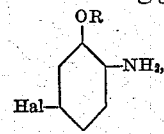

wherein R stands for alkyl or aralkyl.

8. As new products, dichloro compounds of the following general formula:

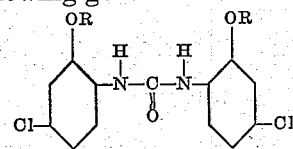

wherein R stands for alkyl or aralkyl, which, when being heated in an aqueous solution of a strong alkali, are split up with formation of an alkali salt of carbonic acid into 2 mols of an amine of the following general formula:

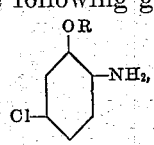

wherein R stands for alkyl or aralkyl.

9. As new products, dihalogen compounds of the following formula:

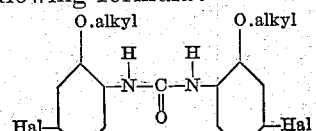

which, when being heated in an aqueous solution of a strong alkali, are split up, with formation of an alkali salt of carbonic acid, into 2 mols of an amine of the following general formula:

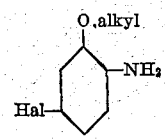

10. As new products, dichloro compounds of the following formula:

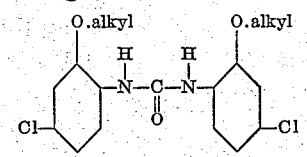

which, when being heated in an aqueous solution of a strong alkali, are split up, with formation of an alkali salt of carbonic acid, into 2 mols of an amine of the following general formula:

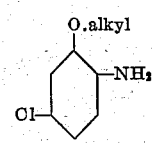

11. As new products, dihalogen compounds of the following general formula:

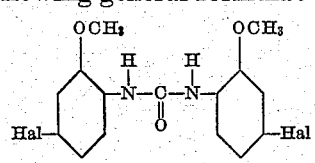

which, when being heated in an aqueous solution of a strong alkali, are split up, with formation of an alkali salt of carbonic acid, into 2 mols of an amine of the following general formula:

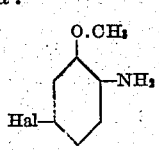

12. As a new product, the dichloro-dimethoxy-diphenyl-urea of the following formula:

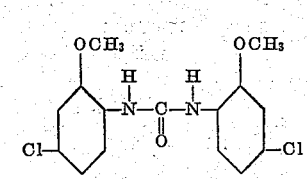

which, when being heated in an aqueous solution of a strong alkali, is split up, with formation of an alkali salt of carbonic acid, into 2 mols of 5-chloro-2-amino-1-methoxy-benzene having its melting point at 52° C.

In testimony whereof I affix my signature.

WILHELM FITZKY.